Figure 1:
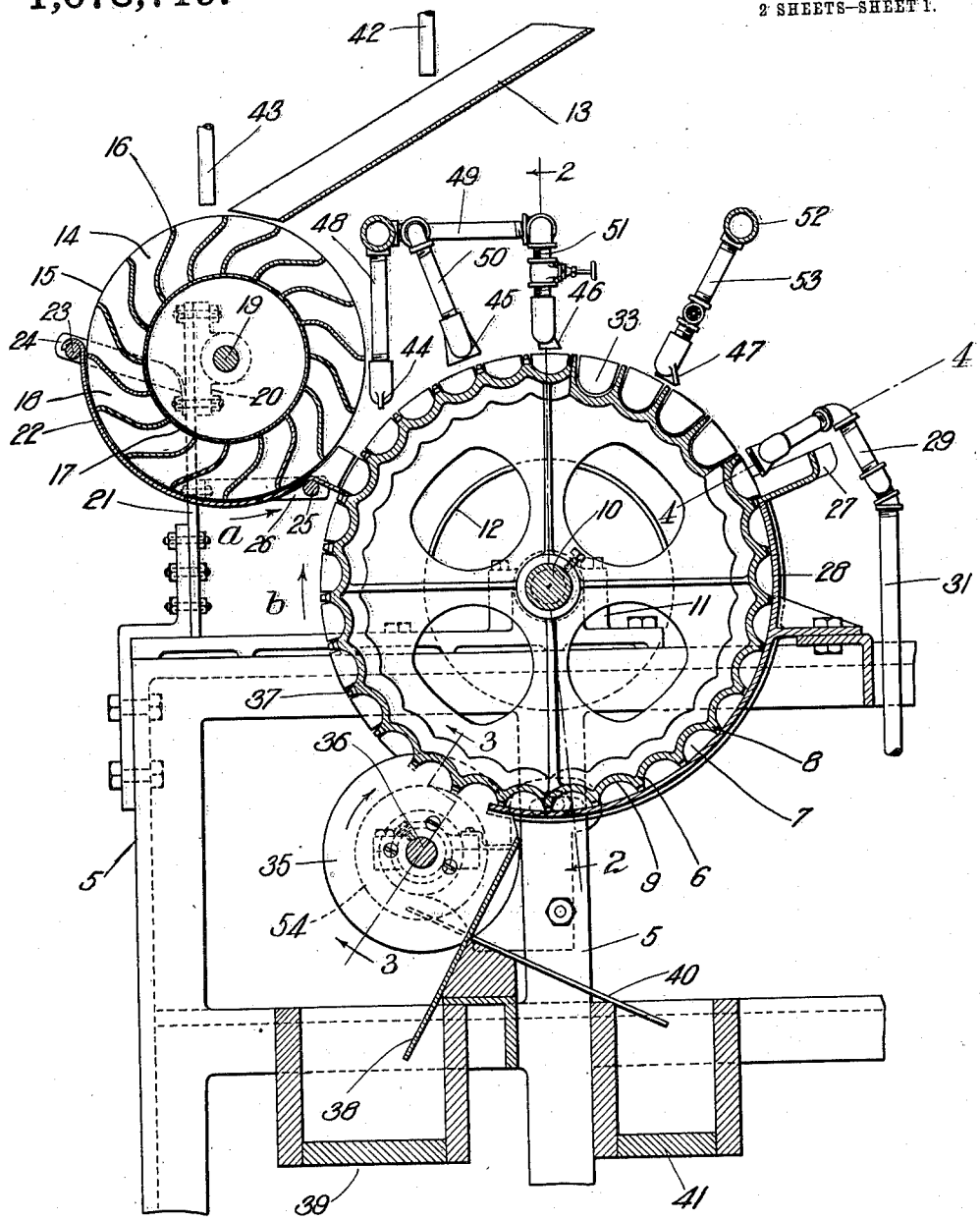

F. D. CLEVELAND.
FISH CUTTING MACHINE.
APPLICATION FILED APR. 16, 1913.

1,078,719.

Patented Nov. 18, 1913.

2 SHEETS—SHEET 1.

Witnesses:
Leonard A. Powell.
Franklin E. Low.

Inventor:
Francis D. Cleveland
by his Attorney
Charles S. Gooding.

F. D. CLEVELAND.
FISH CUTTING MACHINE.
APPLICATION FILED APR. 16, 1913.
1,078,719.
Patented Nov. 18, 1913.
2 SHEETS—SHEET 2.
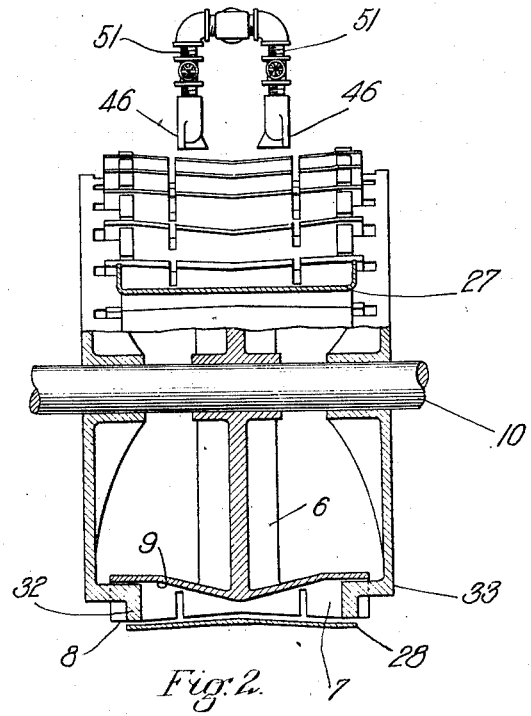
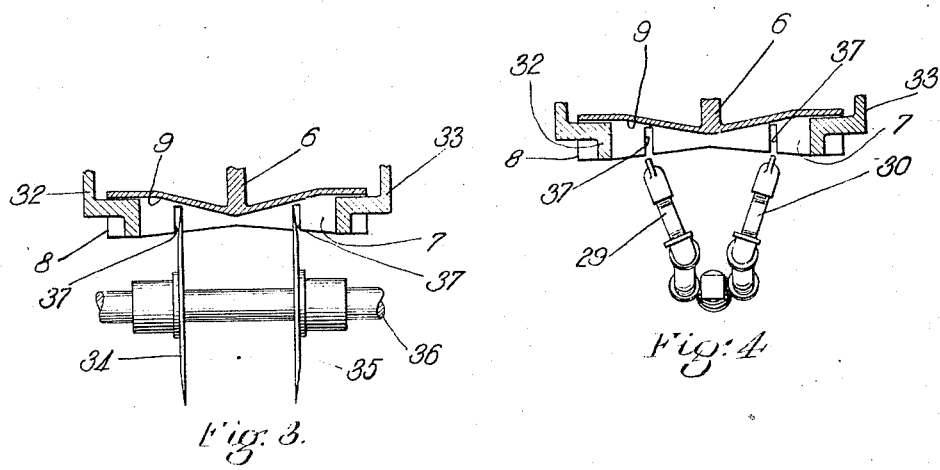
Witnesses:
Leonard A. Powell.
Franklin E. Low.
Inventor:
Francis D. Cleveland
by his Attorney

UNITED STATES PATENT OFFICE.

FRANCIS D. CLEVELAND, OF WINCHESTER, MASSACHUSETTS, ASSIGNOR TO WILLIAM UNDERWOOD COMPANY, OF BOSTON, MASSACHUSETTS, A CORPORATION OF MASSACHUSETTS.

FISH-CUTTING MACHINE.

1,078,719.  Specification of Letters Patent.  Patented Nov. 18, 1913.

Application filed April 16, 1913. Serial No. 761,426.

*To all whom it may concern:*

Be it known that I, FRANCIS D. CLEVELAND, a citizen of the United States, residing at Winchester, in the county of Middlesex and State of Massachusetts, have invented new and useful Improvements in Fish-Cutting Machines, of which the following is a specification.

This invention relates to mechanism for cutting off the heads and tails of fish preparatory to canning the same. The machine is particularly adapted to cut off the heads and tails of fish, such, for instance, as the fish known as sardines.

The invention consists in the combination and arrangement of parts set forth in the following specification and particularly pointed out in the claims thereof.

Referring to the drawings: Figure 1 is a sectional elevation of my improved machine. Fig. 2 is a sectional elevation taken on line 2—2 of Fig. 1. Fig. 3 is a sectional elevation taken on line 3—3 of Fig. 1. Fig. 4 is a sectional elevation taken on line 4—4 of Fig. 1.

Like numerals refer to like parts throughout the several views of the drawings.

In the drawings, 5 is the frame of the machine and 6 is a rotary carrier with pockets 7 provided in its periphery for the reception of the fish from which the heads and tails are to be removed. Said pockets are separated one from the other by partitions 8 extending transversely of the carrier 6 and also of the direction of movement of said carrier. The bottoms 9 of said pockets are convex, the central portions thereof being located at a greater distance from the median axial line of said carrier than the ends. The carrier, as a whole, is fastened to a shaft 10 journaled in suitable bearings 11 on the frame of the machine and is rotated in any suitable manner, as, for instance, by a pulley 12 fast to said shaft 10.

The fish are delivered to the machine through any suitable chute, as, for instance, by means of the chute 13 and said fish pass downwardly along the chute 13 into pockets 14 provided in a feed wheel 15. The pockets 14 are separated from each other by partitions 16 and are provided with bottoms 17. The ends of the pockets 14 are closed by annular flanges 18. The feed wheel 15 is fastened to a shaft 19 journaled in suitable bearings 20 fastened to a bracket 21 which, in turn, is fastened to the frame 5 of the machine. Said feed wheel is rotated by any suitable means, as, for instance, by a pulley fast to the shaft 19.

Beneath the feed wheel 15 and extending partly therearound is a shield or cover 22, the upper end of which is supported by a rod 23 fast to an arm 24 which, in turn, is fastened to the bracket 21. The lower end of the shield 22 is supported upon a rod 25 which, in turn, is fastened to an arm 26, the arm 26 being fastened to the bracket 21. The lower end of the shield 22 terminates adjacent to the periphery of the carrier 6 so that the fish are delivered into the pockets of the carrier directly from the feed wheel 15.

A tray 27 is located at the right of the carrier 6 and extending downwardly from beneath said tray to the bottom of the carrier is a shield or cover 28, the inner face of which is adjacent to the periphery of the carrier 6, and by reference to Figs. 2 and 4 it will be seen that said shield is convex in cross sectional contour.

Two pipes 29 and 30 are arranged to supply suitable fluid, such as water, to the pockets 7 and said pipes are oppositely disposed and located at an angle to the length of the pockets. The pipes 29 and 30 are supplied with fluid from a supply pipe 31. It will be noticed that the pipes 29 and 30 constitute oppositely disposed means for directing jets of fluid under pressure into pockets 7 successively as the carrier 6 is rotating and that these pipes are located so as to deliver streams of water or other suitable fluid into said pockets at points between the centers and the extreme ends thereof. The opposite ends of the pockets 7 are substantially closed, to prevent the fish from being driven out of said pockets by the flow of the water, by annular gages 32 and 33, respectively, these gages being fastened to the shaft 10 and adjustable longitudinally of said shaft to accommodate varying lengths of fish according to the size fish which are being handled by the machine. It will be noted that the gages 32 and 33 constitute stops, therefore, to prevent the fish from being moved entirely out of the pockets 7, but there is a space between the edges of the gages or stops and the bottoms and sides of the pockets (see Figs. 1 and 4). This space is for the purpose of allowing the water to flow out from the ends of the pockets in said carrier, while the gages or stops prevent the fish from so doing.

A pair of rotary cutters 34 and 35 are fastened to a shaft 36 and are rotated by any suitable mechanism, such, for instance, as a pulley 54. These cutters project into the pockets 7 as the carrier rotates and extend transversely of said pockets. The partitions 8 are provided with slots 37 to allow the cutters to project into said pockets and these slots are in alinement with said rotary cutters 34 and 35. The fish pass between the cutters 34 and 35 after having the heads and tails cut therefrom and drop onto a chute 38 down which they slide into a receptacle 39, while the heads and tails which are cut from these fish bodies pass on the outside, respectively, of the rotary cutters 34 and 35 and onto the two chutes 40 located outside said cutters and said heads and tails pass down the two chutes 40 into a receptacle 41.

Water is supplied to the machine hereinbefore described at various points wherever it may be required to float the fish down the chute 13, as by a pipe 42. A pipe 43 may also be provided to supply water to the feed wheel 15 and also pipes are preferably supplied wherever it may be required to wash and cleanse the fish and to position the fish properly in the pockets of the feed wheel 15, and of the rotary fish carrier 6. Other pipes, hereinafter described, for delivering water into the pockets 7 are shown and these pipes are preferably located between the centers and the opposite ends of the pockets and at an angle to said pockets, the arrangement of the pipes around the periphery of the carrier 6 being similar to, and preferably like, that shown in U. S. patent issued to me June 25, 1912, No. 1,030,646, Machine for handling and cutting fish.

It will be understood that when the fish are delivered to the carrier, there may be one, two or three delivered to a single pocket; they may be delivered with their heads all pointing one way, or they may be delivered in various positions, as, for instance, the fish may lie longitudinally within the pockets or they may extend transversely of the pockets. It is, however, the object of this invention to have the fish lie longitudinally of the pockets with their heads against the annular gages 32, 33, as the case may be, in order that when the heads and tails are cut from the fish, they shall be cut at the proper point and not spoil the fish by cutting the same in the wrong place. Therefore, as the rotary carrier 6 is rotated from the point at the left where the fish are first fed into the pockets from the feed wheel 15 they are carried up and first come into contact with the stream of water delivered by the nozzle 44. This stream of water serves to remove any fish which may lie transversely of the pockets and outside of the periphery of the carrier and such fish will be forced off of the wheel by the stream from the nozzle 44 and will fall back into succeeding pockets in the carrier or into one of the pockets in the feed wheel 15 to be later delivered to the carrier again. This stream from the nozzle 44 will also, to a certain extent, move any fish which may lie in the pockets longitudinally thereof in a direction lengthwise of said pockets. The next streams of water which are delivered to the pockets and against the fish are delivered by the nozzles 45, 46 and 47 successively, all as clearly set forth and described in said patent. In addition to the action of the streams of water from the different nozzles, the convex shape of the bottoms of the pockets aid materially in placing the fish with their heads against the gages 32 and 23 in position to have the heads and tails subsequently cut therefrom by the cutters 34 and 35. The fish naturally slide down the inclines in opposite directions in the direction in which their heads may be pointed. Especially is this the fact since the fish is heavier at the head than at the tail end and will naturally tip on the inclined portion so as to slide down in the direction in which his head may be pointed toward the gage 32 or the gage 33, as the case may be. It will be understood that water is supplied to the nozzles 44, 45, 46 and 47 by suitably arranged and connected supply pipes 48, 49, 50, 51, 52 and 53. When the fish are carried by the carrier 6 behind the shield 28 they are gradually transferred by gravity and by the water from resting on the inclined bottoms of the pockets onto the convexly inclined inner surface of the shield 28 and this convexly inclined inner surface of said shield still further aids in placing the fish as they approach the cutters to have their heads and tails removed. Since the shield 28 is made convex, it follows that the outer edges of the partitions 8 must be made concave to accommodate themselves to the convex inner face of said shield, as clearly seen in Fig. 2.

The general operation of the machine hereinbefore specifically and to some extent in general described is as follows: The fish slide down the chute 13 into the pockets of the rotary feed wheel, said feed wheel rotating in the direction of the arrow $a$ (Fig. 1). As the feed wheel is rotated the fish are carried downwardly and as they pass along the under side of said feed wheel rest upon the shield 22 and are pushed along said shield by the partitions 16. Said fish are pushed by said partitions off of the shield 22 and pass into the pockets 7 of the carrier 6, said carrier 6 rotating in the direction of the arrow $b$ (Fig. 1), and are carried around as hereinbefore described beneath the different nozzles 44, 45, 46 and 47 and the nozzles of the pipes 29 and 30 and are carried by the streams of water from said nozzles toward the gages 32 and 33, the convexly inclined bottoms of the pockets 7 aiding materially in placing the fish with their heads against said gages. As the carrier 6 is rotated still farther the fish, dropping from the pockets against the convexly inclined inner surface of the shield 28, are still more accurately positioned with their heads against said gages. Finally the partitions 8 feed the fish along the inner face of the shield 28 until they are brought into contact with the cutters 34 and 35, whereupon their heads and tails are severed from the bodies, the bodies passing down the chute 38 into the receptacle 39 and the heads and tails passing down the chutes 40 into the receptacle 41. From the receptacle 39 the bodies are carried along by suitable conveying means either to brine tanks or to any desired receptacle, and the heads and tails are carried from the receptacle 41 to any other desired position or receptacle.

Having thus described my invention, what I claim and desire by Letters Patent to secure is:

1. A carrier, movable in a given direction, with pockets therein extending transversely thereof and of the direction of movement of said carrier, the bottoms of said pockets being convex.

2. A carrier, movable in a given direction, with pockets therein extending transversely thereof and of the direction of movement of said carrier, the bottoms of said pockets being convex, with the highest point of said bottoms substantially midway between the ends thereof.

3. A carrier, movable in a given direction, with pockets therein extending transversely thereof and of the direction of movement of said carrier, the bottoms of said pockets being convex and a convex shield adjacent to the periphery of said carrier and extending downwardly therebeneath, the inner face of said shield being convex transversely thereof.

In testimony whereof I have hereunto set my hand in presence of two subscribing witnesses.

FRANCIS D. CLEVELAND.

Witnesses:
CHARLES S. GOODING,
SYDNEY E. TAFT.